United States Patent [19]

Hicks, Jr. et al.

[11] 4,095,767
[45] Jun. 20, 1978

[54] TRAILER HITCH HAVING ELASTOMER-IN-SHEAR CUSHIONING IN THE DIAGONAL STRUT

[75] Inventors: Paul E. Hicks, Jr., Florissant; James C. Hammonds, St. Charles, both of Mo.

[73] Assignee: ACF Industries, Incorporated, New York, N.Y.

[21] Appl. No.: 785,991

[22] Filed: Apr. 8, 1977

Related U.S. Application Data

[60] Division of Ser. No. 601,149, Aug. 1, 1975, which is a continuation-in-part of Ser. No. 457,256, Apr. 2, 1974, abandoned.

[51] Int. Cl.$^2$ ............................................. B65J 1/22
[52] U.S. Cl. ............................. 248/119 S; 105/368 B
[58] Field of Search .................. 248/119 R, 119 S; 105/368 B, 368 S; 267/63 R, 63 A, 140, 141, 153; 293/88

[56] References Cited

U.S. PATENT DOCUMENTS

| 2,880,681 | 4/1959 | Markestein et al. | 105/368 S |
| 3,140,081 | 7/1964 | Peterson | 267/153 |
| 3,167,288 | 1/1965 | Farabaugh | 105/368 S X |
| 3,246,866 | 4/1966 | Price et al. | 105/368 S X |
| 3,262,402 | 7/1966 | Mowatt-Larssen et al. | 105/368 S |
| 3,358,955 | 12/1967 | Wille et al. | 248/119 S |
| 3,370,550 | 2/1968 | Gutridge et al. | 248/119 S X |
| 3,479,969 | 11/1969 | Hammonds | 105/368 S |
| 3,722,939 | 3/1973 | Church et al. | 267/63 A X |

FOREIGN PATENT DOCUMENTS

| 156,657 | 1/1953 | Australia | 267/63 A |
| 40,212 | 7/1965 | Germany | 267/63 R |
| 1,168,267 | 4/1964 | Germany | 267/63 A |

Primary Examiner—Lawrence J. Staab
Attorney, Agent, or Firm—Henry W. Cummings

[57] ABSTRACT

A diagonal strut energy absorbing cushioning assembly for use in a trailer hitch for holding piggyback trailers in place on railway flat cars including an inclined longitudinally extending fixed member attached to the deck of a railway car and an inclined longitudinally extending movable member spaced from said fixed member. The movable member is attached to a kingpin engagement assembly of a railway trailer hitch for holding in place the kingpin of a highway trailer. A resilient assembly is carried by the fixed and movable members. The resilient assembly includes at least one elastomeric member attached to a first surface on the fixed member and a second surface spaced from the first surface attached to the movable member. The elastomeric material is shearable between the first and second surfaces under cushioning loads. The fixed and movable members further include side portions which together with the first and second surfaces cooperate to define a housing for the resilient material, including spaced, juxtaposed flange portions. One of the flange portions includes a channel and the other of the flange portions includes a projection located within the channel. The projection is movable relative to the channel to guide movement of the movable member relative to the fixed member as the resilient material deflects in shear during cushioning of the trailer hitch.

3 Claims, 36 Drawing Figures

of application Ser. No. 457,256 filed Apr. 2, 1974, abandoned.
TRAILER HITCH HAVING ELASTOMER-IN-SHEAR CUSHIONING IN THE DIAGONAL STRUT

REFERENCE TO RELATED APPLICATION

This application is a division of application Ser. No. 601,149 filed Aug. 1, 1975 which in turn is a continuation-in-part of application Ser. No. 457,256 filed Apr. 2, 1974, abandoned.

BACKGROUND OF THE INVENTION

Previously, hitches for transporting highway trailers on transportation vehicles, particularly on railway cars have utilized rubber-in-compression cushioning in the diagonal strut. This is described, for example, in U.S. Pat. No. 3,145,006. Another construction illustrated in U.S. Pat. Nos. 3,246,866 and 3,512,739 utilized hydraulic cushioning in the diagonal strut.

The construction according to the U.S. Pat. No. 3,145,006 requires too large a cushioning unit and particularly in the collapsed position the cushioning unit takes up too much room. Presently in the collapsed position the hitch may not extend vertically above the deck more than 6 inches, to avoid interference with containers to be mounted on pedestals whose mounting surfaces are 6 inches above the deck.

U.S. Pat. No. 3,493,207 discloses a tractor operated hitch which is cushioned at the base of the diagonal strut with a rubber-in-shear cushioning unit. However, this unit requires a separate housing, and does not utilize the design envelope of the diagonal strut and is thus expensive. Furthermore, some trailers have a transverse rod connecting the dolly wheels. The rubber-in-shear unit interferes with the transverse rod. Thus hitches using rubber-in-shear cushioning at the base of the strut require special operator handling. The trailers having this rod must be raised to clear the cushioning unit according to the U.S. Pat. No. 3,493,207 construction. Thus it is not considered desirable to mount the cushioning unit at the base of the diagonal strut.

The hitch of the present invention is designed to take a 10 mph impact in service. It is believed that this is the largest impact speed encountered in most railway switching yards and this impact speed occurs relatively infrequently. During such a 10 mph impact, our data indicates that about 85,000 to 90,000 ft. lbs. of work are applied to the cushioning unit as a result of such impact. The present AAR maximum allowable kingpin force is 210,000 pounds. When the rubber-in-compression unit was developed, according to the U.S. Pat. No. 3,145,006 there was no maximum allowable kingpin force, and the kingpin force in some instances may be as high as 250,000 pounds for a 10 mile per hour impact. Taking into account the maximum allowable kingpin force of 210,000 pounds and the 85,000 to 90,000 ft. lbs. work applied to the cushion unit and the fact that rubber-in-compression units can only absorb on the order of 10.5 ft. lbs. per cubic inch the rubber-in-compression unit would have to be in excess of 13 feet in length for a 5 × 10 inch rectangular cross section. This length is not practical. It is also preferred that the maximum hitch height of 6 inches above the deck not be achieved by requiring the formation of openings in the deck.

In accordance with the hydraulic cushion structure illustrated in the U.S. Pat. Nos. 3,246,866 and 3,512,739 inspection and maintenance costs are higher than desired. Furthermore, the original cost of the unit is considered by some to be high due to the many machined surfaces and close tolerances required in the hydraulic portion of the assembly.

SUMMARY OF THE INVENTION

It is therefore an object of the present invention to provide a trailer hitch for use on railway cars to carry overland trailers wherein cushioning is provided in the diagonal strut of the hitch, and in which the size of the hitch in the collapsed condition is minimized, preferably to not more than 6 inches above the deck.

It is another object of the present invention to provide a cushioning unit for use in the diagonal strut in which the initial cost is lower than hydraulic cushioning units.

It is another object of the present invention to provide a cushioning unit in the diagonal strut in which the required length of the cushioning unit to absorb the impact forces is considerably less than would be required in a rubber-in-compression unit.

It is another object of the present invention to provide a cushioning unit for use in the diagonal strut in which the initial cost is lower than hydraulic cushioning units.

It is another object to provide a cushioning unit wherein inspection and maintenance costs of the units are minimized.

A diagonal strut energy absorbing cushioning assembly for use in a trailer hitch for holding piggyback trailers in place on a railway flat car is provided. The assembly includes an inclined longitudinally extending fixed member. The fixed member includes means for attaching the strut to the deck of a railway car. An inclined longitudinally extending movable member is spaced from the fixed member. The movable member includes means for attaching the strut to a kingpin engagement assembly of a railway trailer hitch for holding in place the kingpin of a trailer. A resilient assembly is carried by the fixed and said movable members. The resilient assembly includes at least one elastomeric member having attached thereto a first surface of said fixed member and attached to a second surface, spaced from said first surface, on said movable member. In cross section the first and second surfaces are generally parallel and the elastomeric material is shearable between the first and second surfaces under cushioning loads. The fixed and movable members each include side portions which cooperate to define a housing for the resilient material including spaced, juxtaposed flange portions. One of the flange portions comprises a channel and the other of said flange portions comprises a projection located within said channel. The projection is movable relative to the channel to guide movement of said movable member relative to said fixed member as said resilient material deflects in shear during cushioning of said trailer hitch.

THE DRAWINGS

In curve B a cover plate was integrally affixed between movable side members, such as 240 and 242, in FIG. 5.

DETAILED DESCRIPTION

Figure 1:
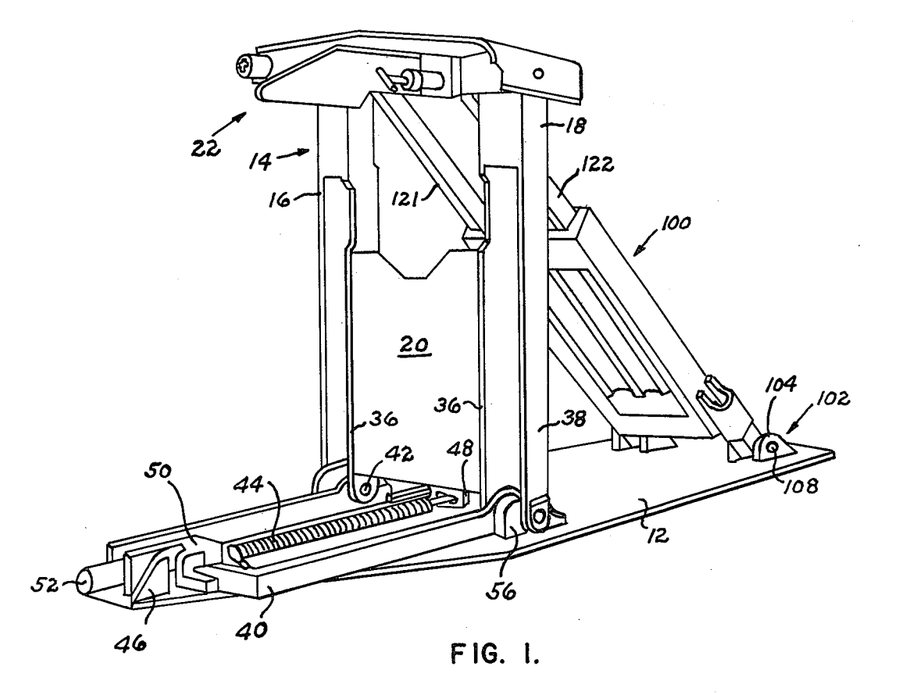
FIG. 1 is a schematic perspective view of a hitch having elastomer-in-shear in the diagonal strut in accordance with the present invention.

With reference now to the drawings for a more detailed description of our invention, FIG. 1 illustrates a trailer hitch or support device 10 for the fifth-wheel of a semi-trailer to be transported by a railway flat car. The trailer hitch structure 10 is preferably mounted on a base plate 12 which is welded or otherwise fixed to the deck of a railway flat car, not shown. The trailer hitch structural elements, however, may be directly connected to the deck of the railway flat car, if desired, without departing from the spirit or scope of this invention. The trailer hitch structure includes a vertical support 14 including a pair of parallel legs 16 and 18 which are interconnected by means of a brace plate 20 or similar bracing structure. A fifth-wheel support or kingpin engagement assembly 22 is connected by means of a pivot to the upper extremity of the legs 16 and 18 and is adapted to pivot from a position substantially normal to the vertical support 14 in the upright position of the hitch as shown in FIG. 1 to a position substantially parallel to the vertical support 14 in the collapsed position of the hitch 10. This pivotal movement allows the fifth-wheel assembly 22 to be disposed in substantially parallel relation with the base plate 12 in both the upright and collapsed positions of the hitch.

The fifth-wheel support 22 may be constructed in accordance with any one of a number of commercially acceptable types which releasably secure the fifth-wheel of a semi-trailer to the trailer hitch structure.

The trailer hitch is provided with a diagonal strut or diagonal leg shown generally at 100 which is pivotally connected to the upper extremity of the vertical support 14 and has its lower extremity connected to base plate 12 by appropriate pivot means 102, for example, by means of a pivot 108 and lugs 104 which are welded or otherwise fixed to base plate 12. The construction of the diagonal leg 100 and its operative relationship with the structural elements of the trailer hitch 10 are set forth in detail hereinbelow.

Each of the vertical parallel legs 16 and 18 of the vertical support 14 is bifurcated at its lower extremity defining inner and outer clevis plates 36 and 38 respectively. A horizontal operating frame 40 is connected by means of pivots 42 to the inner clevis plates 36 thereby establishing pivotal connection between the horizontal frame and the vertical support 14. An operating screw 44 for raising and lowering the trailer hitch 10 between its operative and stored or collapsed positions is retained in parallel relation with the base plate 12 by bearing structures 46 and 48. The operating screw 44 is provided with drive threads and is threadingly received within an internally threaded frame drive assembly 50 carried by the operating frame 40. The operating screw 44 is provided at its outer extremity with drive connection structure 52 for connecting the operating screw to manual or mechanical means for imparting rotation to the operating screw.

In the operative position of the trailer hitch 10 as illustrated in FIG. 1, the pivot pins 42 are maintained in engagement with abutment lugs 56, which are fixed to the base plate 12 by welding or the like. In the operative position of the trailer hitch as shown in FIG. 1, the pivot pins 42 will form a substantially fixed pivot for the lower extremities of the vertical supports. To collapse the trailer hitch to its stored or collapsed position, the operating screw 44 is rotated in a direction driving the operating frame 40 rearwardly toward the lugs 56. The operating frame by virtue of its connection with the vertical support will force the lower portion of the vertical support 14 rearwardly thereby causing the vertical support to be lowered to a position where it lies flat on the base plate 12 or on the deck of the railway car. At the same time, the fifth-wheel support will pivot to a position where it is substantially parallel with the vertical support 14 and will be lowered with the vertical support until it rests flat on or adjacent to the deck of the railway car. The collapsed height of the trailer hitch is such that riser boards are not required to maintain proper clearance between the collapsed hitch and the axle of a trailer being loaded onto the car. This feature promotes the competitive nature of railway cars by achieving low cost construction. Furthermore, it is preferred that the collapsed height not exceed 6 inches to avoid interference with containers to be mounted on 6 inch high pedestal surfaces.

Figure 1A:
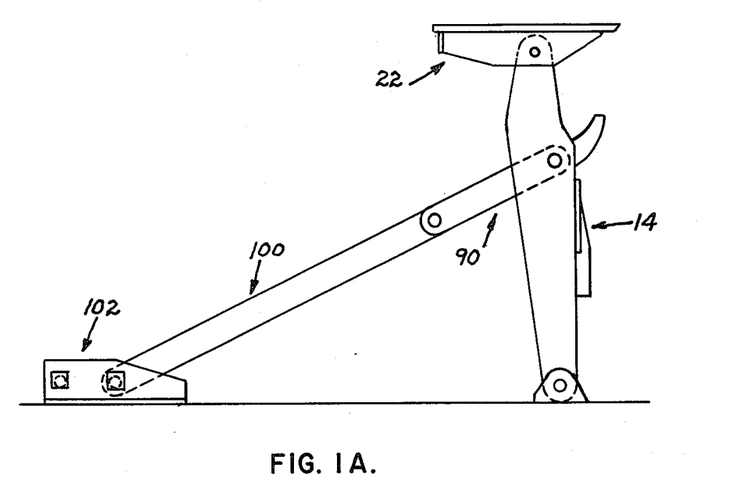
FIG. 1A is a schematic view illustrating alternative hitches which may utilize the elastomer-in-shear diagonal strut cushioning of the present invention.

Alternatively, the hitch may be raised and lowered automatically, known in the art as "tractor operated", as shown schematically in FIG. 1A and described in U.S. Pat. Nos. 3,262,402 3,183,853, 3,143,978, 3,168,878 and 3,493,207 which are hereby incorporated into the present application by this reference.

Also, it is known in the art that the diagonal strut may be attached directly to the kingpin or fifth wheel engagement assembly, as shown in FIG. 1. Also, the diagonal strut may be attached to the vertical legs as shown in FIG. 1A generally at 90 and shown and described in detail in U.S. Pat. Nos. 3,493,207, 3,358,955, 3,190,595, 3,262,402, 3,246,866 (FIGS. 7-9), 3,041,028, 3,168,878, 3,183,853, 3,143,978, which are hereby incorporated into the present application by this reference.

Figures 2, 3, 4:
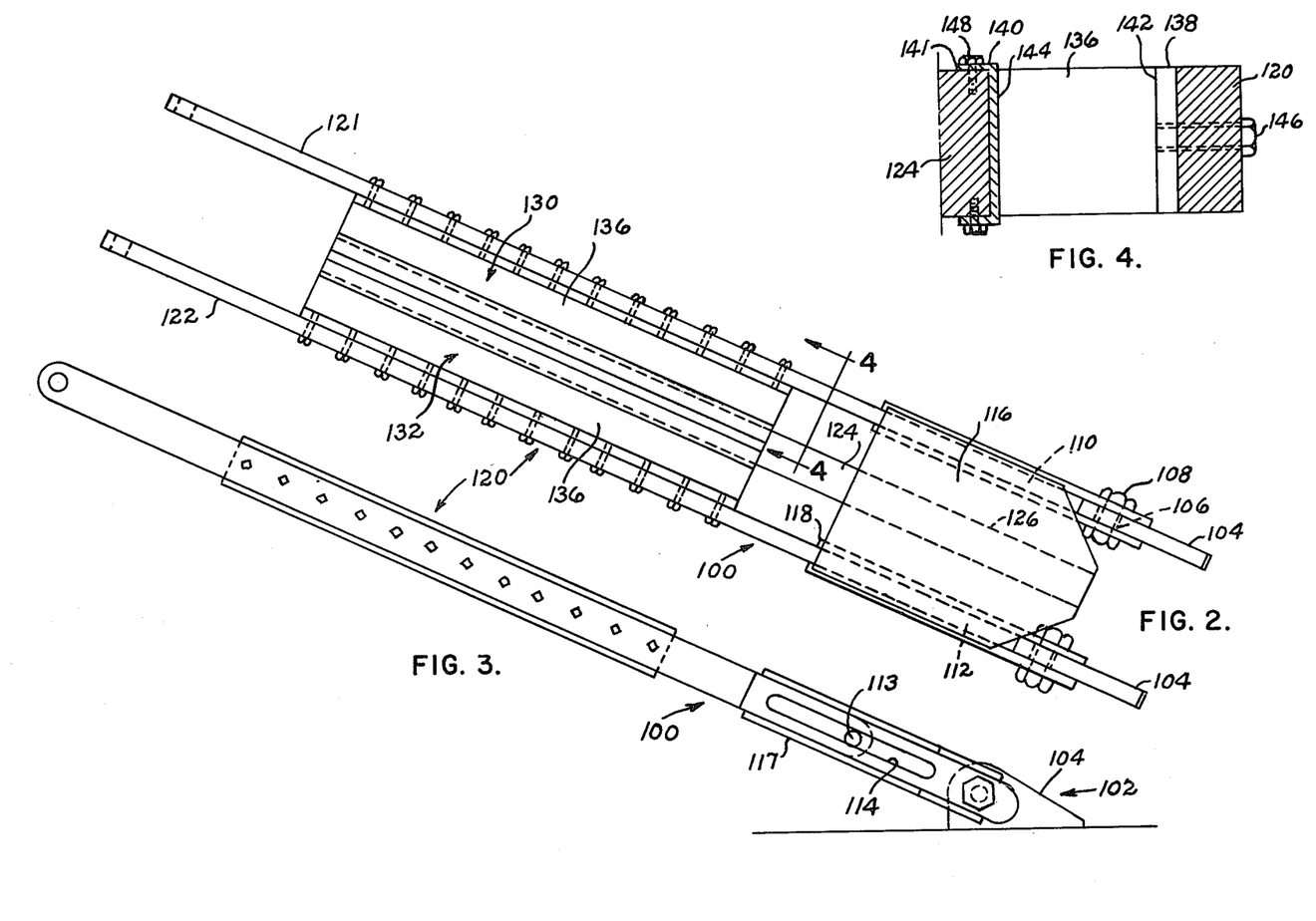
FIG. 2 is a top view of a diagonal strut having an elastomer-in-shear cushioning in accordance with one embodiment of the present invention.
FIG. 3 is a side elevational view of the diagonal strut shown in FIG. 2.
FIG. 4 is a view along the lines 4—4 in FIG. 2.

One embodiment of the present invention is shown in FIGS. 2 and 3 and of the drawings. In this embodiment a diagonal strut for a trailer hitch is indicated generally at 100. Means 102 are provided for mounting the diagonal strut upon a car deck directly or upon base plate 12 in FIG. 1. For example, lugs 104 may be affixed to the deck or base plate, for example, by welding. Lugs 104 are preferably provided with openings 106, in which pin type fasteners 108 hold in place spaced apart guide plates 110 and 112. The guide plates are provided with longitudinally extending slots 114. A fixed cover plate 116 is affixed to the guide plates, for example, by welding, as indicated at 118. If desired, a lower fixed cover plate may also be provided as indicated at 117.

The diagonal strut cushioning assembly of the present invention is indicated generally at 120. The cushioning unit in this embodiment comprises spaced apart longitudinally extending bars or arms forming movable side members 121 and 122. These movable side members are mounted within slots 114 of guide plates 110 and 112 by means of appropriate pin type fasteners 113. It will be apparent that movable side members 120 and 122 can slide back and forth as pin fasteners 113 move within slots 114.

The hitch cushioning unit further comprises a longitudinally extending center member of column preferably 124 made of metal, most preferably steel. Column 124 is integrally affixed to the lower support structure. For example, as shown in FIGS. 2 and 3, column 124 is welded to the fixed cover plate 116, as indicated at 126 and to lower cover plate 117.

Mounted on opposite sides of center column member 124 are spaced apart resilient assemblies 130 and 132. The elastomeric portion of these assemblies 136 and of the other resilient assemblies herein disclosed, may be made of any of the known natural or synthetic rubbers of an elastomeric nature. In general, the elastomer should have hardness values of 40 to 70 durometer and shear deformation capabilities of one to fifteen inches and the ability to absorb at least about 35 ft.lbs./in$^3$ during cushioning; preferably at least 38 ft.lbs./in$^3$. Examples of appropriate elastomeric materials include polyethylene, polypropolene, ethylene-propylene copolymers, polyurethane, and natural or synthetic rubber.

The elastomer-in-shear assembly requires considerably less inspection and maintenance than hydraulic cushioning units, and is less expensive to manufacture, due to less machining and labor costs.

As shown in FIG. 4, the resilient assembly comprises an elastomeric portion 136 and bonding or fastening members 138 and 140 adapted to respectively affix the elastomeric member to the central column 124 and to the movable side members 120 and 122. In the embodiment shown in FIG. 4, elastomeric member 136 is integrally bonded to the fastening members 138 and 140. This bonding is preferably carried out with known bonding or vulcanization techniques, such as an epoxy or urethane adhesive with an appropriate curing cycle. The respective bonds are indicated in the drawings at 142 and 144. The elastomeric assembly including the respective bonds 142 and 144 to the respective fixed and movable portions in FIG. 2, and in the other embodiments disclosed herein, are preferably capable of absorbing a force of at least about 100,000 pounds in 9 inches of travel and/or at least about 210,000 pounds in 12 inches of travel.

Mechanical fasteners 146 and 148 are utilized to affix resilient assemblies 130 and 132 respectively, to movable side members 120 and 122, and center column 124. Fastening members 140 may have a flange portion 141 into which fasteners 148 fits. If desired, flange portion 141 may be countersunk as indicated in FIG. 4.

It will be apparent that when a load is applied axially, in either direction, upon the cushioning unit the side members 120 and 122 move with respect to the fixed center column 124 putting the resilient assemblies 130 and 132 in shear.

Another embodiment of the present invention is shown in FIGS. 5 through 8. The diagonal strut is indicated generally at 200. The diagonal strut again comprises means indicated generally at 202 for affixing the diagonal strut to the flat car deck or to a base plate, for example, spaced apart lugs 204 may be provided appropriately affixed with fasteners or welding indicated at 206 to the car deck or base plate. Furthermore, a plate 208 is provided between lugs 204 and affixed thereto, for example, by welding as indicated at 209. Spaced apart fixed side plates 210 are provided which are affixed to lugs 204 by means of appropriate pin fasteners 212. Integrally affixed to the side plates 210, for example, by mechanical fasteners or welding are upper and lower fixed cover plates 214 and 216. One or more drain holes 218 may be provided in bottom plate 216.

Figure 7:
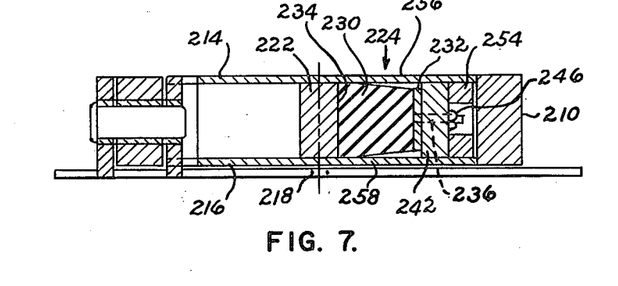
FIG. 7 is a view along the lines 7—7 in FIG. 5.
Figure 8:
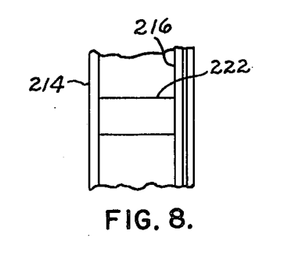
FIG. 8 is a view along the lines 8—8 in FIG. 5.

The diagonal strut cushioning assembly is indicated generally at 220. The cushion assembly comprises a generally longitudinally extending center column member 222 having on opposite sides resilient assemblies 224 and 226. As shown in FIG. 7 the resilient assemblies comprise an elastomeric member 230 having integrally bonded thereto a metal insert or plate 232. In this embodiment elastomeric member 230 is bonded directly to center column member 222 as indicated at 234. This bond is again made by appropriate adhesive bonding and/or vulcanization techniques known in the art.

Figure 5:
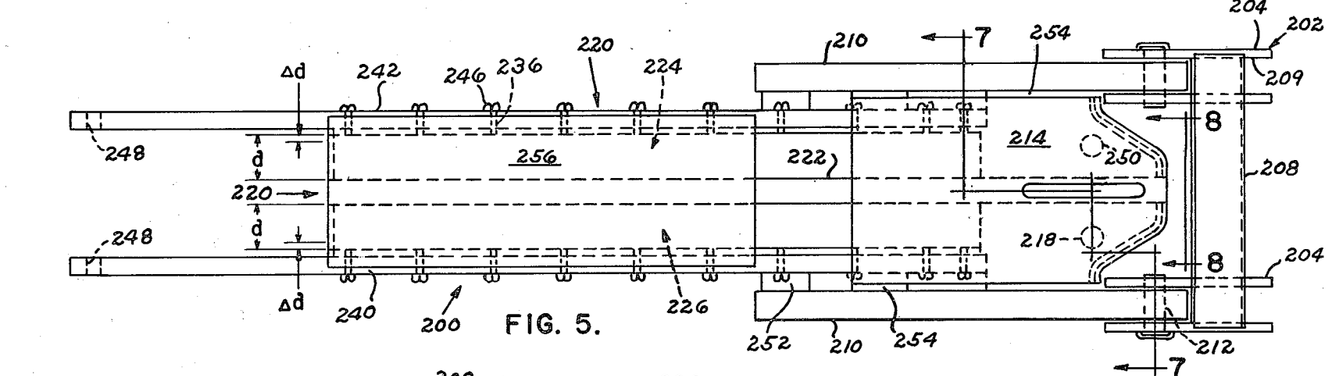
FIG. 5 is a top view of another embodiment of a diagonal strut utilizing elastomer-in-shear cushioning according to the present invention.

Mounted upon inserts or plates 232 are a plurality of studs 236 to facilitate affixing the resilient assemblies to spaced apart movable side members 240 and 242. Nuts 246 may then be utilized to hold the resilient assemblies in engagement with the movable side members. Movable side members 240 and 242 are then affixed to the kingpin engagement assembly by appropriate means, for example, through openings 248.

The lower portion of column 222 is appropriately affixed to the lower fixed portion of the strut. For example, column 222 may be welded along the bottom to fixed bottom plate 216 and welded to the upper fixed cover plate 214 by means of welding openings 250 therein.

Fixed stops are applied to fixed side plates 210 as indicated at 252. Movable stops are affixed to movable side members 240 and 242 as indicated at 254. In the event of an axial force tending to extend the diagonal strut assembly, movable stops 254 will engage fixed stops 252 after resilient assemblies 224 and 226 have cushioned this movement by putting resilient members 230 in shear.

Preferably, at least one upper movable cover plate 256 and most preferably also a lower movable cover plate 258 are affixed to movable side members 240 and 242. These plates may be affixed to members 240 and 242 by welding as shown in FIGS. 5-8 or by mechanical fasteners.

Figure 6:
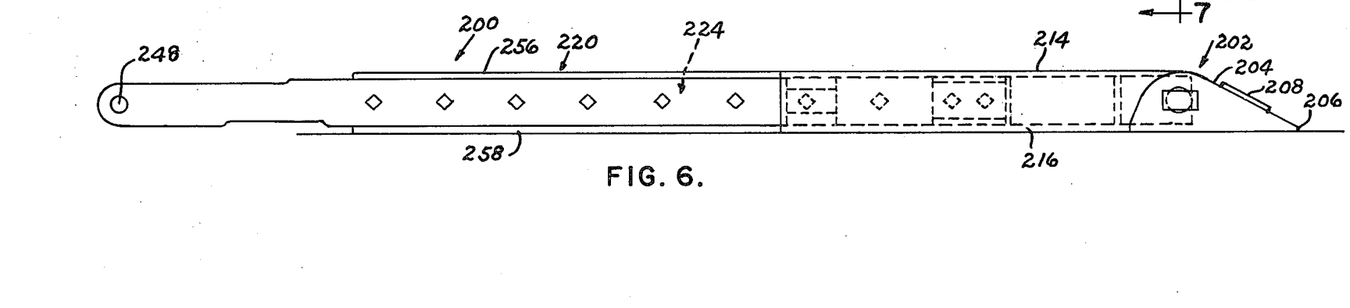
FIG. 6 is a side elevational view of the diagonal strut shown in FIG. 5.
Figure 9:
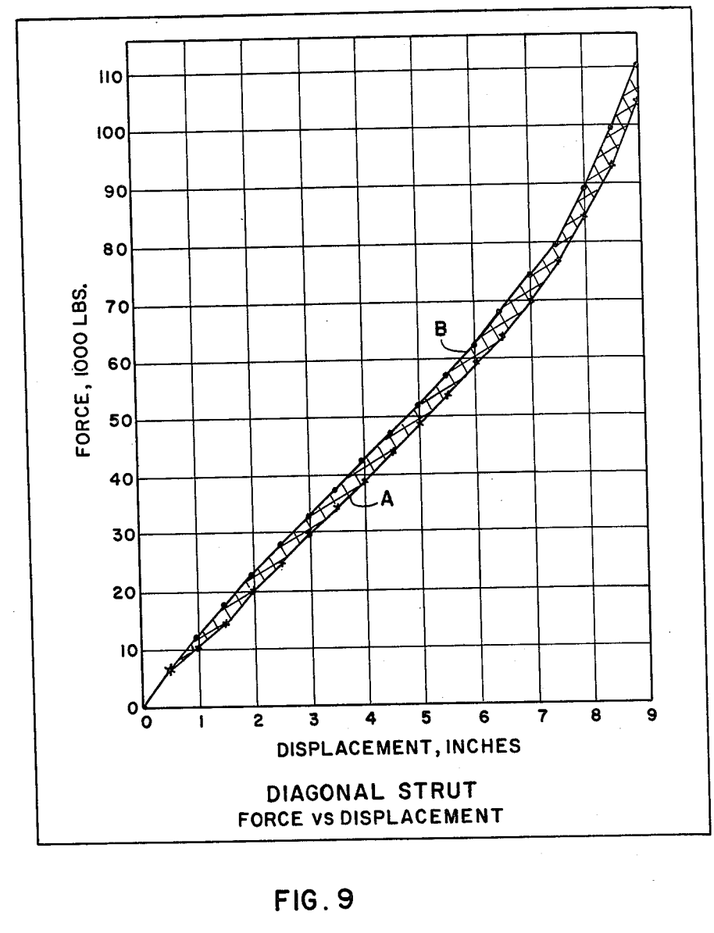
FIG. 9 is a plot of applied longitudinal force against deflection for the elastomeric material. In curve A a cover plate was not utilized between the movable portions of the diagonal strut.

It was found in the embodiment shown in FIGS. 2 through 4 that when loads were taken by resilient assembly 120 that movable side members 121 and 122 deflected inwardly in cushioning a left to right force as shown in FIGS. 2 and 3. Similarly, there was a tendency for members 121 and 122 to move inwardly, in the event of tension or pull from right to left. As shown in FIG. 7, movable cover plates 256 and/or 258 act to reduce this tendency. Thus, with the cover plates in place the arrangement shown in FIGS. 5 through 7 is capable of cushioning more force per unit length of elastomer than without the cover plates. FIG. 9 illustrates the difference in cushioning characteristics of the elastomer-in-shear diagonal strut cushioning with (curve B) and without the cover plates (curve A) in place in a cushioning unit having 9 inches of travel. The unit without cover plates absorbed in excess of 100,000 pounds in 9 inches, while the unit with cover plates absorbed in excess of 110,000 pounds.

Figure 11:
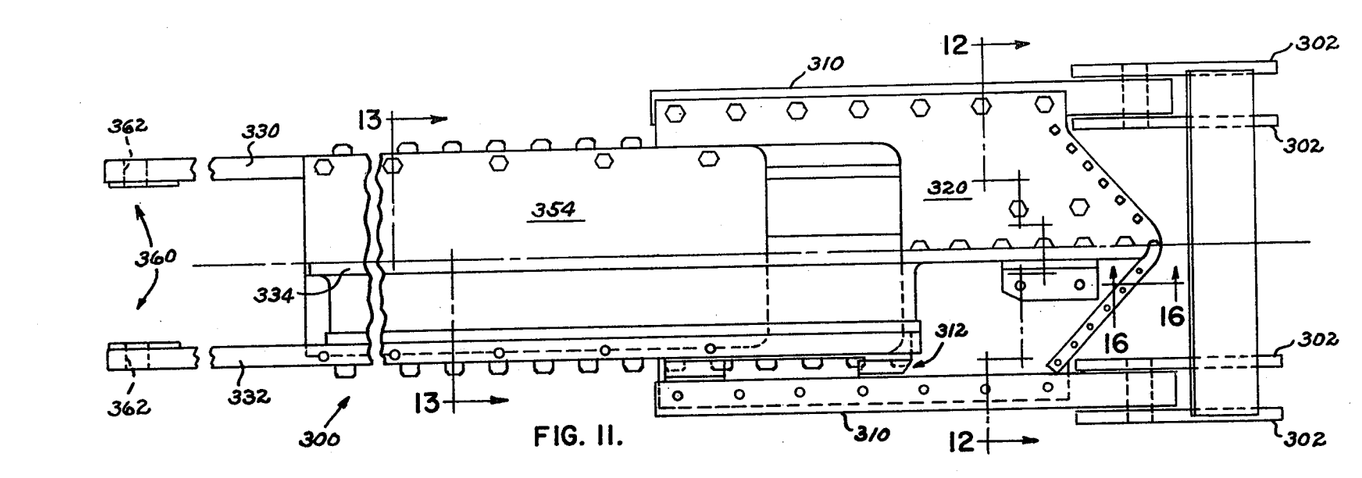
FIG. 11 is a top view of another embodiment of a diagonal strut utilizing elastomer-in-shear cushioning.
Figure 12:
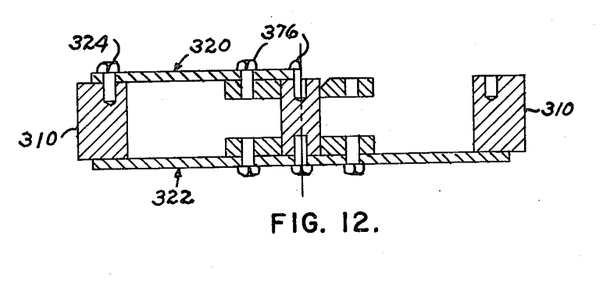
FIG. 12 is a view along the lines 12—12 in FIG. 11.
Figure 13:
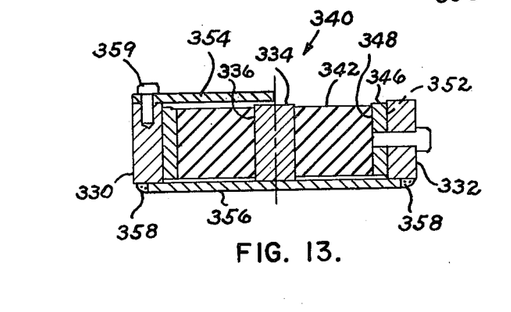
FIG. 13 is a view along the lines 13—13 in FIG. 11.
Figure 14:
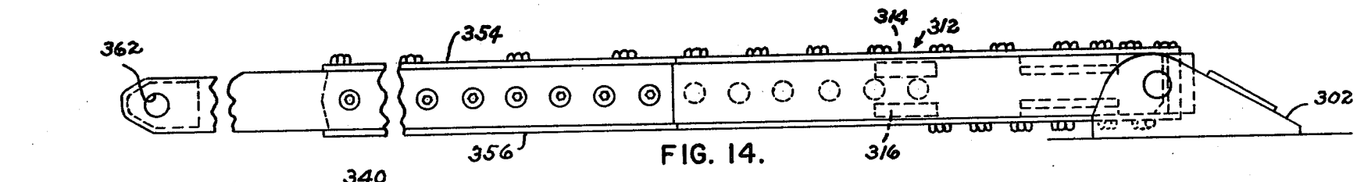
FIG. 14 is a side elevational view of the diagonal strut shown in FIG. 11.
Figure 18:
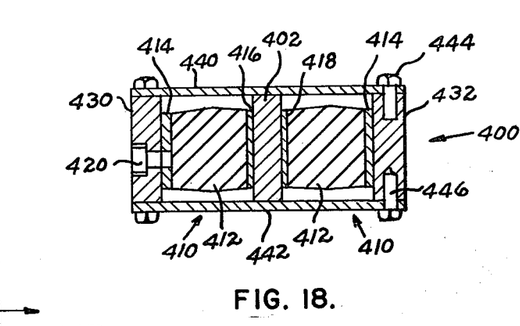
FIG. 18 is a cross-sectional view of another embodiment of the elastomer-in-shear diagonal strut of the present invention.
Figure 19:
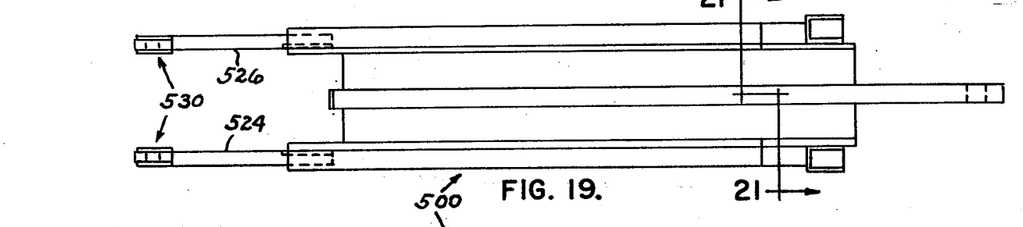
FIG. 19 is a top view of a diagonal strut utilizing the elastomer-in-shear cushioning of the present invention.
Figures 22, 23, 24:
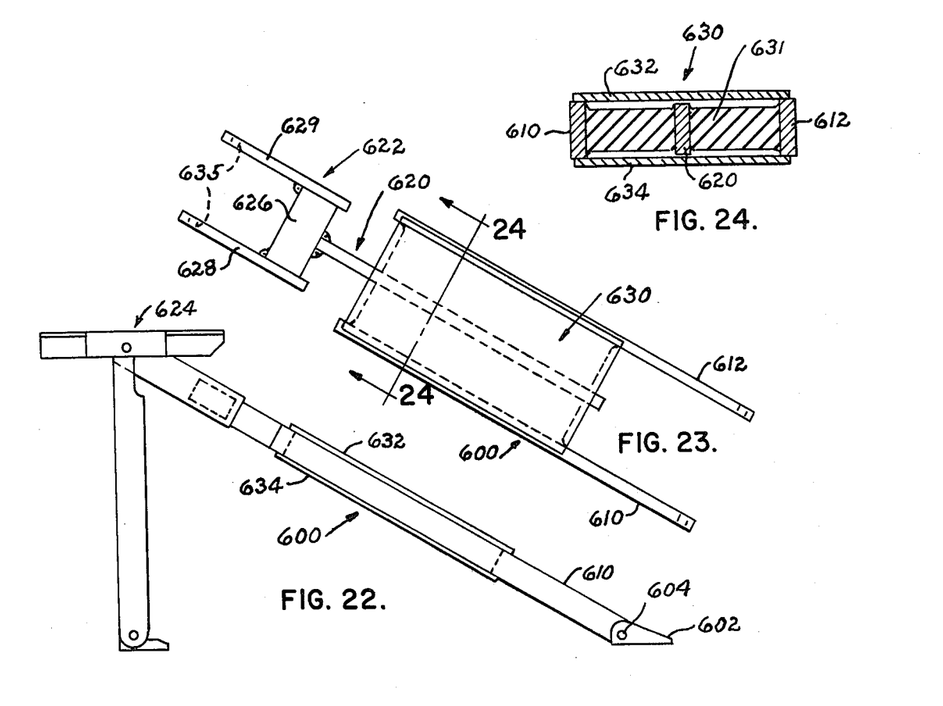
FIG. 22 is a side elevation of another embodiment of an elastomer-in-shear diagonal strut and hitch according to the present invention.
FIG. 23 is a top view of the diagonal strut shown in FIG. 22.
FIG. 24 is a view along the lines 24—24 in FIG. 23.

The shaded area between curves A and B represents for a given displacement the additional energy which the cushioning assembly can absorb with the cover plates as compared to the energy the assembly can absorb without cover plates. Furthermore, it will be apparent that one or more cover plates can also be applied to the movable arms as shown in FIGS. 11, 18, 19 and to fixed arms, for example, as shown in FIG. 23, and a generally similar increase in energy absorption per length of displacement can also be achieved.

In the event of axial forces tending to reduce the length of the diagonal strut applied to the cushioning assembly as shown in FIGS. 5 and 6, movable cover plates 256 and/or 258 engage fixed cover plates 214 and/or 216 as a stop means after the elastomer has deflected in shear. Furthermore, in the event of failure of the elastomeric material or of any of the fastening means between columns 222 and members 230 and/or 232 and movable side members 240 and 242, the fixed cover plates 214 and/or 216 will engage movable plates 256 and/or 258 and provide a stop means to prevent the hitch from disengaging and/or collapsing. Similarly, in the event of axial forces tending to extend the diagonal strut and/or elastomer-to-column fastener failure and/or elastomer-to-movable fastener failure, side member fixed stop 252 will engage movable stops 254 and prevent the hitch from becoming disengaged and/or collapsing.

Another embodiment of the present invention is shown in FIGS. 11 through 17. In this embodiment the diagonal strut is indicated at 300. Locking lugs 302 are again provided to hold the diagonal strut in place. Side plates 310 are provided having mounted thereon fixed stop means 312. In this embodiment fixed stop means 312 comprise upper and lower stop portions 314 and 316. Upper and lower fixed cover plates 320 and 322 are provided and in this embodiment mechanical fasteners, for example, screws 324 are used to hold the plates in engagement with side plates 310.

Movable side members 330 and 332 are provided having therebetween a fixed center column member 334 and a resilient assembly 340 on opposite sides therof. Resilient assembly 340 comprises an elastomer member 342 integrally bonded to center column 334, for example, by adhesive bonding as indicated at 336. Elastomeric assembly 340 further comprises a plate 346 integrally bonded, for example, by adhesive bonding to elastomeric member 342 as indicated at 348. Plate 346 is preferably threaded as indicated at 352 to facilitate affixing elastomeric assembly 342 to side members 330 and 332. Preferably at least one, and most preferably both upper and lower movable cover plates 354 and 356 are again affixed to side members 330 and 332, for example, by welding as indicated at 358 and/or with mechanical fasteners, for example, screws 359 to hold in place upper cover plate 354. Side members 330 and 332 are provided with appropriate means indicated generally at 360, for example, openings 362 for an engagement with an appropriate kingpin engagement assembly.

Figure 15:
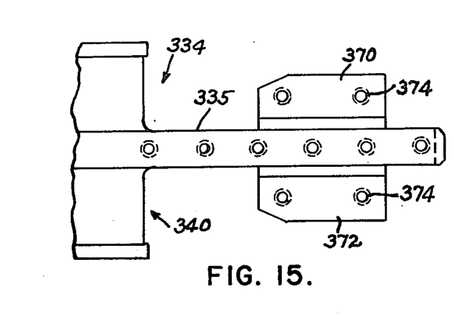
FIG. 15 is an enlarged top view of the center column member in FIG. 11 illustrating the fastening means utilized to hold the same in engagement with the lower fixed portion of the diagonal strut.
Figure 16:
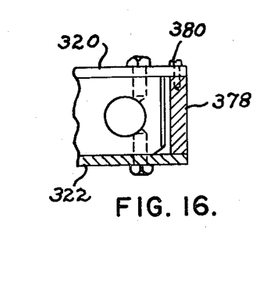
FIG. 16 is a view along the lines 16—16 in FIG. 11.
Figure 17:
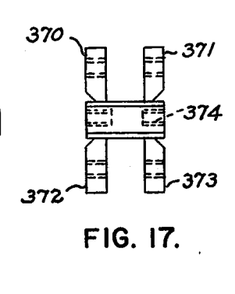
FIG. 17 is an end elevational view of the lower portion of the center column member illustrated in FIG. 15.

As shown in FIG. 15 the lower portion 335 of column 334 may be provided with one or more flanges 370, 371, 372 and 373. The flanges and lower column 335 have a plurality of bolt openings therein 374. These bolt openings are utilized to affix column member 334 to the fixed portion of the hitch, for example, by means of bolts 376. For applications where it is desired to disassemble the diagonal strut, it is preferred to use mechanical fasteners to hold the fixed portion of the column in engagement with the fixed bottom portion. Thus, curved vertical member 378 in FIG. 16 is affixed to fixed cover plate 320 by means of fasteners 380. However, if desired, lower cover plates 322 may be joined to curve vertical member 378 by welding.

Another embodiment of the cushioning assembly is indicated in FIG. 18, generally at 400. In this embodiment a center column member 402 is provided having on either side thereof resilient assemblies 410. The resilient assemblies comprise elastomeric members 412 having integral therewith metal inserts 414 and 416. Inserts 416 adjacent the column member 402 are affixed to the center column member by means of an appropriate cement, adhesive, or vulcanization bond indicated at 418. Mechanical fasteners 420 are utilized to provide engagement between inserts 414 and movable side members 430 and 432. Preferably at least one and most preferably both upper and lower cover plates 440 and 442 are affixed to movable side members 430 and 432 with appropriate fasteners, such as screws 444 or by welding.

Figure 20:
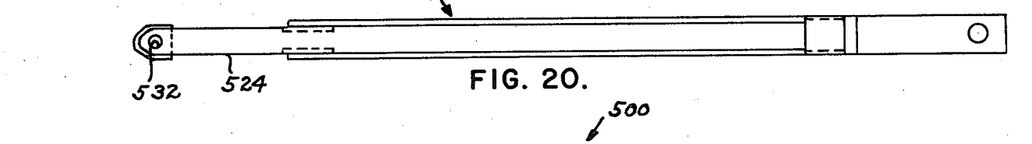
FIG. 20 is a side elevational view of the diagonal strut shown in FIG. 19.
Figure 21:
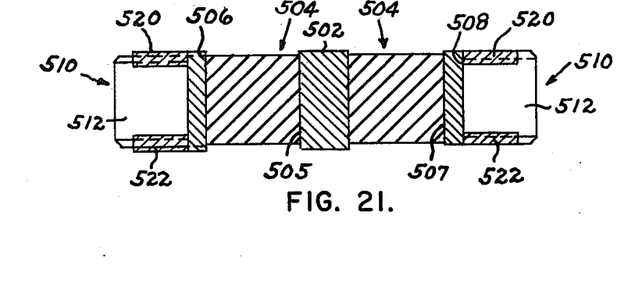
FIG. 21 is a view along the lines 21—21 in FIG. 19.

Still another embodiment of the present invention is shown in FIGS. 19 through 21. In this embodiment a cushioning assembly is indicated generally at 500, which comprises a center column member 502. Resilient assemblies 504 are directly bonded respectively to center column 502 and movable side members 506 and 508, respectively by means of vulcanization or cement or adhesive bonds indicated at 505 and 507. Appropriate vulcanization and/or bonding techniques known in the art or urethane adhesive bonding are utilized to form bonds 505 and 507.

It will be apparent that in this embodiment the resilient assembly is simplified in that metal inserts for bonding and fastening to column member 502 and/or movable side members 506 are not required.

Movable side members 506 and 508 preferably have outwardly extending upper and lower flanges 520 and 522 along the longitudinal length thereof. Movable stop means are provided on movable side members 506 and 508 as indicated generally at 510. The movable stops, for example, may comprise block members 512.

Extensions 524 and 526 may be affixed to side members 506 and 508 either by appropriate mechanical fasteners or by welding. Each of the extensions 524 and 526 is provided with means indicated generally at 530 to affix the respective side members to a kingpin engagement assembly. For example, this may be done with openings 532.

Another embodiment of the present invention is shown in FIGS. 22 through 24. In this embodiment a diagonal strut indicated generally at 600 comprises fastening lugs 602 having pin fasteners 604 passing therethrough to pivotally affix to the lugs to fixed side members 610 and 612. A movable center column member 620 passes between the side members 610 and, as shown in FIG. 24, a resilient assembly or element 630 comprising elastomeric material 631 is bonded to the side members 610 and 612 and to center column 620. Center column member has means affixed thereto 622 for affixing the center column in engagement with the kingpin of the trailer hitch 624. For example, this may comprise a plate 626 welded to the center column. Plate 626 in turn is provided plates or arms 628 and 629 which may have openings therein 635 for affixing the diagonal strut to the kingpin assembly 624.

Preferably cover plates 632 and 634 are affixed to side members 610 and 612 as shown in FIGS. 22 and 24.

It will be apparent that axial loads applied to kingpin assembly 624 will place the elastomeric material 631 in shear.

Figures 25, 26, 27:
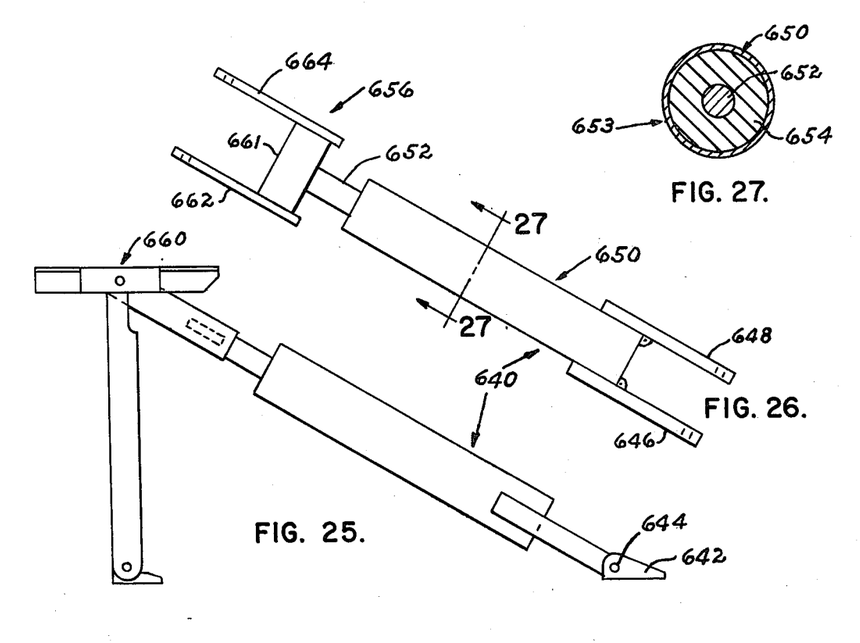
FIG. 25 is a view of another embodiment of the elastomer-in-shear diagonal strut and hitch of the present invention.
FIG. 26 is a top view of the diagonal strut shown in FIG. 25.
FIG. 27 is a view along the lines 27—27 in FIG. 26.

Still another embodiment of the present invention is shown in FIGS. 25 through 27. In this embodiment a diagonal strut is indicated generally at 640. Again, the strut comprises mounting lugs 642 which by means of pin fasteners 644 hold in place spaced apart fixed plates 646 and 648. Integrally affixed to plates 646 and 648, for example by welding, is a tubular shell 650, preferably made of strong metal, such as steel. As shown in FIG. 27 a rod or shaft 652 is mounted within tubular shell 650. A resilient assembly or element 653 comprising elastomeric material 654 is bonded to the outer tubular shell and to the shaft or rod 652. Shaft or rod 652 is integrally affixed to means indicated generally at 656 for engagement with a kingpin assembly indicated generally at 660. For example, the means 656 may comprise a plate 661 integrally affixed to arms 662 and 664, which arms in turn are attached to kingpin engagement assembly 660.

It will be apparent that axial loads applied to kingpin assembly 660 will place the elastomeric material 654 in shear.

It will be apparent to those skilled in the art that the shaft 652 may be made the fixed member mounted on the car deck or base plate and housing 650 the movable member integrally affixed to kingpin engagement assembly 656.

Figures 28, 29, 30:
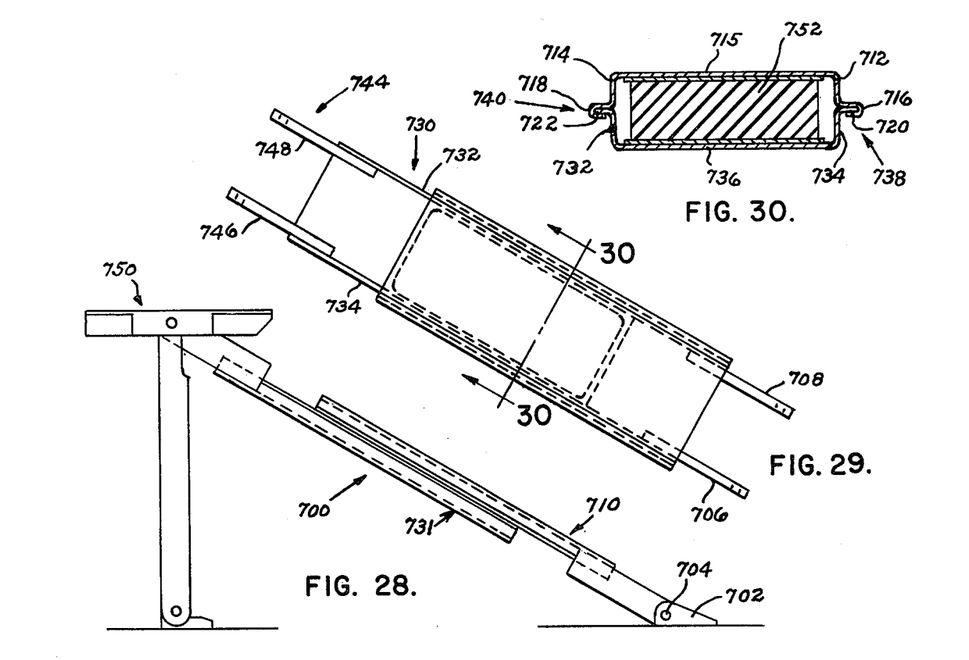
FIG. 28 is another embodiment of the elastomer-in-shear diagonal strut and hitch of the present invention.
FIG. 29 is a top view of the diagonal strut shown in FIG. 28.
FIG. 30 is a view along the lines 30—30 in FIG. 29.

Still another embodiment of the present invention is shown in FIGS. 28–30 of the drawings. In this embodiment the diagonal strut is indicated generally at 700. The diagonal strut again comprises lugs 702 which by means of pins 704 hold in pivotal engagement spaced apart plates 706 and 708. Integrally affixed to spaced apart plates 706 and 708 is an upper housing indicated generally at 710. Housing 710 comprises sides 712 and 714 having outwardly extending portions respectively 716 and 718 defining openings or channels therein 720 and 722. A movable assembly indicated generally at 730 comprises a lower housing indicated generally at 731 comprising spaced apart plates 732 and 734 which are joined together by a bottom pan 736. Movable arms or plates 732 and 734 are also provided with appropriate projection 738 and 740 adapted to cooperate with contours 720 and 722 and be movable back and forth therein. Means 744, for example, spaced apart arms 746 and 748 are again provided to join the diagonal strut to the kingpin engagement assembly 750.

A resilient element 752 comprising elastomeric material 754 is bonded to cover 715 and to cover plate 736 and/or arms 732 and 734.

It will be apparent that the lower housing 731 may be made the fixed and outer housing with housing 710 the movable and inner housing if desired.

It will be apparent that either generally longitudinal pushes or pulls from the kingpin assembly applied to movable assembly 730 will place resilient element 752 in shear.

Still another embodiment of the present invention is shown in FIGS. 31–35. In this embodiment the diagonal strut is indicated generally at 800. Again, lugs 802 are provided to affix the diagonal strut to a base plate or directly to the car deck. Diagonal strut comprises a fixed assembly indicated generally at 803, including spaced apart plates 804 and 806 by means of pins 808 are pivotally affixed to lugs 802. Integrally affixed to plates 804 and 806 are side plates 810 and 812. At the upper end of the plates 810 and 812, a cover plate 814 joins the plates and a bottom plate 816 joins plates 810 and 812. Similar cover and bottom plates 817 and 818 respectively are provided on the lower portion of the diagonal strut affixed to side members 810 and 812.

Figures 31, 32, 33:
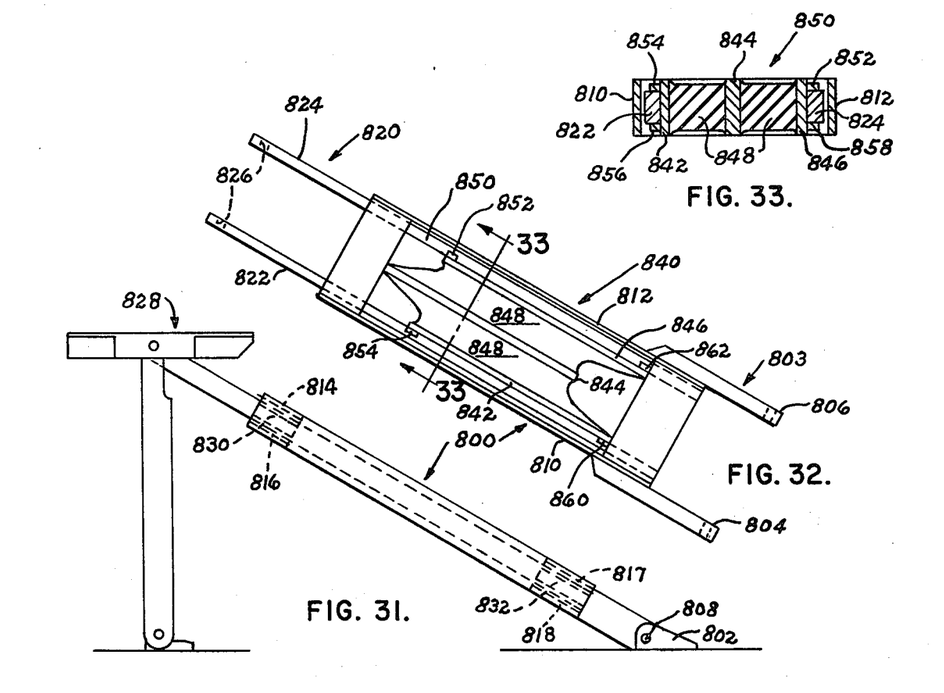
FIG. 31 is a view of another embodiment of the elastomer-in-shear diagonal strut and hitch according to the present invention.
FIG. 32 is a top view of the diagonal strut illustrated in FIG. 31.
FIG. 33 is a view along the lines 33—33 in FIG. 32.

A movable assembly indicated generally at 820 comprising spaced apart plates or arms 822 and 824 are provided having means such as openings 826 for engagement with a kingpin assembly 828. Transverse members or plates 830 and 832 are also integrally affixed between plates or arms 822 and 824.

Mounted between the fixed and movable assembly is a resilient assembly indicated generally at 840. Resilient assembly 840 preferably comprises three plates 842, 844 and 846. Elastomeric material 848 preformed, for example, by molding to the shape shown in FIG. 32, is bonded to center plate 844 and to side plates 842 and 846. Guide means indicated generally at 850 comprising guides 852, 854, 856, 858, 860 and 862 together with two other guides directly below 860 and 862 (not shown) are in sliding engagement with plates or arms 822 and 824 for back and forth movement of resilient assembly 840 within the diagonal strut.

Figure 34:
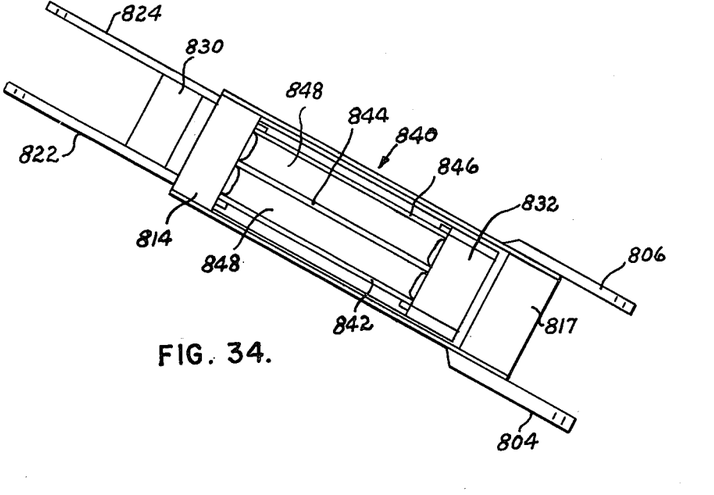
FIG. 34 is a top view of the diagonal strut shown in FIGS. 31—33 in a draft position.

As shown in FIG. 34 if a draft load is applied to the diagonal strut movable transverse plate 832 engages side plates 842 and 846 of resilient assembly 840. However, fixed plates 814 and 816 prevent plate 844 from moving thus putting the elastomeric material 848 in shear. A draft stop is provided when plate 832 engages center plate 844.

Figure 35:
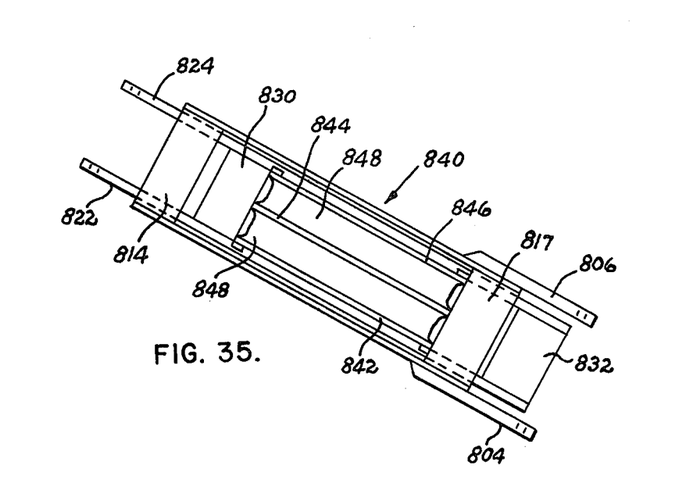
FIG. 35 is a view of the diagonal strut of the present invention illustrated in FIGS. 31-33 in a buff position.

In the event of a buff load applied to the diagonal strut as shown in FIG. 35, movable transverse plate 830 engages center plate 844 and moves the resilient assembly 840 from left to right as shown in FIG. 35. However, plates 817 and 818 engage resilient assembly side plates 842 and 846 and prevent the same from moving downwardly, thus putting the resilient material 848 in shear. A buff stop is provided when plate 830 engages side plates 842 and 846. It will be apparent to those skilled in the art that the arrangement shown in FIGS. 31–35 may be reversed. Thus upon a buff load, outer plates 842 and 846 move relative to center plate 842, and under a draft load center plate 844 moves relative to plates 842 and 846.

Figure 10:
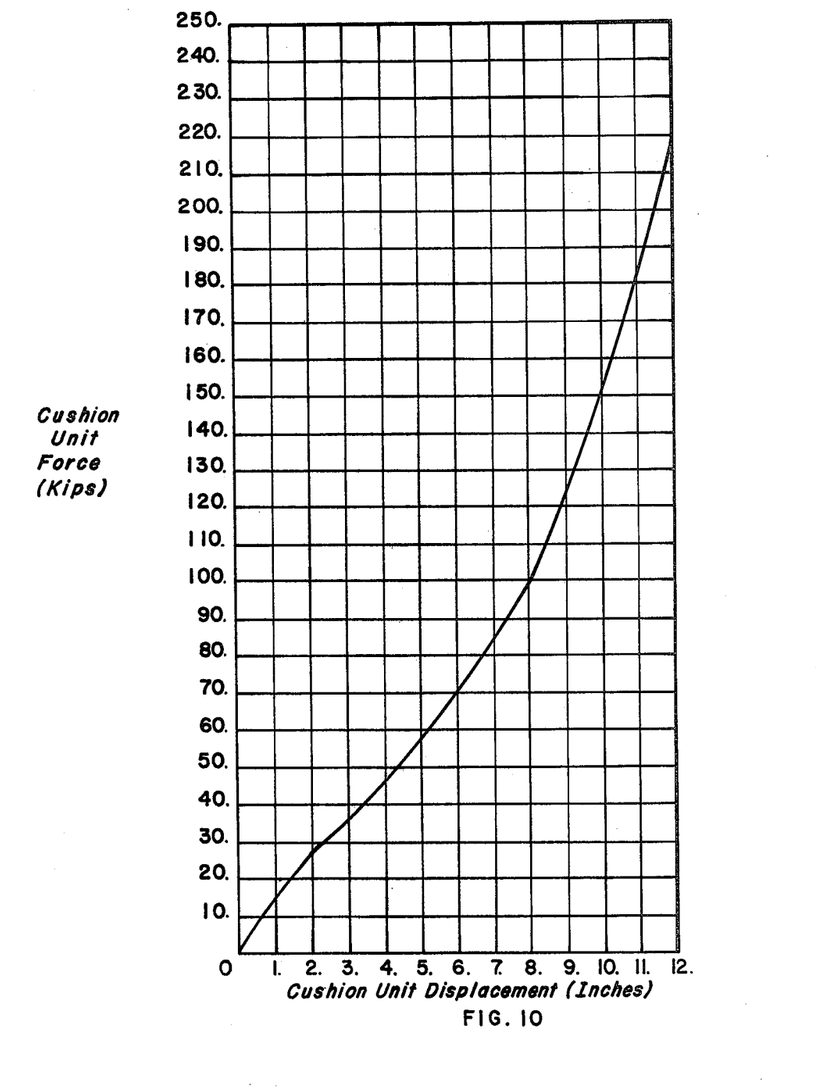
FIG. 10 is a plot of cushion unit displacement against cushion unit applied force for an elastomer-in-shear unit having 12 inches of travel.

FIG. 10 illustrates a unit having 12 inches of travel and cover plates may absorb in excess of 210,000 pounds, which is the present maximum allowed kingpin force.

The curves shown in FIGS. 9 and 10 are based on experimental tests carried out by the assignee of the present application at the direction of the inventors. The curves are presented to show a general technological effect and in presenting the numerical data shown in the curves, the application is not to be construed as limited to these specific values.

In accordance with another embodiment of the present invention, the fatigue life of the cushioning assembly is increased by placing the elastomeric material under lateral compression during assembly. This can be done, for example, by applying lateral inward forces to the movable arms, for example, 240 and 242 in FIG. 5 toward center column member 220. Means are then provided to maintain this inward lateral displacement $\Delta d$. According to one technique, during operation at least one cover plate 256 then is applied between the movable arms to maintain the inward displacement of the elastomeric material. Preferably a lower cover plate is also utilized for this purpose 258. If the elastomeric material is moved laterally inwardly $\Delta d$, for example, from 2 to 15%, most preferably 5 to 10%, an increase in the fatigue life of the assembly can be increased by 3 to 10% or more. The resilient assemblies of the other embodiments of the present invention may be similarly preloaded in compression, particularly the embodiments shown in FIGS. 2, 11, 18, 19, 23, 26 and 27, 29 and 30 and 32.

If the elastomeric material is placed under lateral compression as described in the previous paragraph, the effect of the cover plates resulting in greater energy absorption for a given length of displacement of the diagonal strut, however, is reduced or eliminated. Thus, in regard to the use of cover plates, those skilled in the art will have to decide in utilizing the present invention whether it is more important to maximize energy absorption per length of displacement or maximize fatigue life of the cushioning assembly. While it may be possible to obtain some increases in energy absorption per unit length of displacement and some increase of fatigue life if only small lateral compressive displacements are utilized, such as up to about 6%, in general, a choice should be made between which property it is desired to maximize and design the cushioning unit to maximize either fatigue life or energy absorption per length of displacement.

What is claimed is:

1. A diagonal strut energy absorbing cushioning assembly for use in a trailer hitch for holding piggyback trailers in place on railway flat cars comprising:

an inclined longitudinally extending fixed member; said fixed member having means attached thereto for affixing the same to the deck of a railway car; an inclined longitudinally extending movable member, spaced from said fixed member; said movable member having means for affixing said strut to a kingpin engagement assembly of a railway trailer hitch for holding in place the kingpin of a highway trailer; a resilient assembly carried by said fixed and said movable members, said resilient assembly comprising at least one elastomeric member attached to a first surface of said fixed member and attached to a second surface on said movable member, spaced from said first surface; said first and second surfaces being generally parallel; said elastomeric material being shearable between said first and second surfaces under cushioning loads; said fixed and movable members each further including spaced side portions which, together with said first and second surfaces, define a housing for said elastomeric material; said side portions including spaced juxtaposed flange portions extending away from said resilient material; one of said juxtaposed flange portions comprising a channel and the other of said flange portions comprising a projection located within said channel; said projection being movable relative to said channel to guide movement of said movable member relative to said fixed member as said resilient material deflects in shear during cushioning of said trailer hitch.

2. A diagonal strut energy absorbing cushioning assembly according to claim 1 wherein said channel is located in said fixed member and said projection is located in said movable member.

3. A diagonal strut energy absorbing cushioning assembly according to claim 1 wherein said channel is located in said movable member and said projection is located in said fixed member.

* * * * *

UNITED STATES PATENT AND TRADEMARK OFFICE
CERTIFICATE OF CORRECTION

PATENT NO. : 4,095,767
DATED : June 20, 1978
INVENTOR(S) : Paul E. Hicks, Jr. and James C. Hammonds It is certified that error appears in the above-identified patent and that said Letters Patent are hereby corrected as shown below:

Title should be changed from: "Trailer Hitch Having Elastomer-In-Shear Cushioning In The Diagonal Strut" to --Railway Trailer Hitch Having Channel Shaped Elastomer-In-Shear Diagonal Strut and Cooperating Projection--.

Col. 5, line 35, after "3" delete "and".

Col. 9, line 35, after "affix" delete "to".

Col. 10, line 26, "projection" should read --projections--.

line 56, "are" should read --is--.

Col. 12, line 9, "increases" should read --increase--.

Signed and Sealed this

Twelfth Day of December 1978

[SEAL]

Attest:

RUTH C. MASON
Attesting Officer

DONALD W. BANNER
Commissioner of Patents and Trademarks